UNITED STATES PATENT OFFICE.

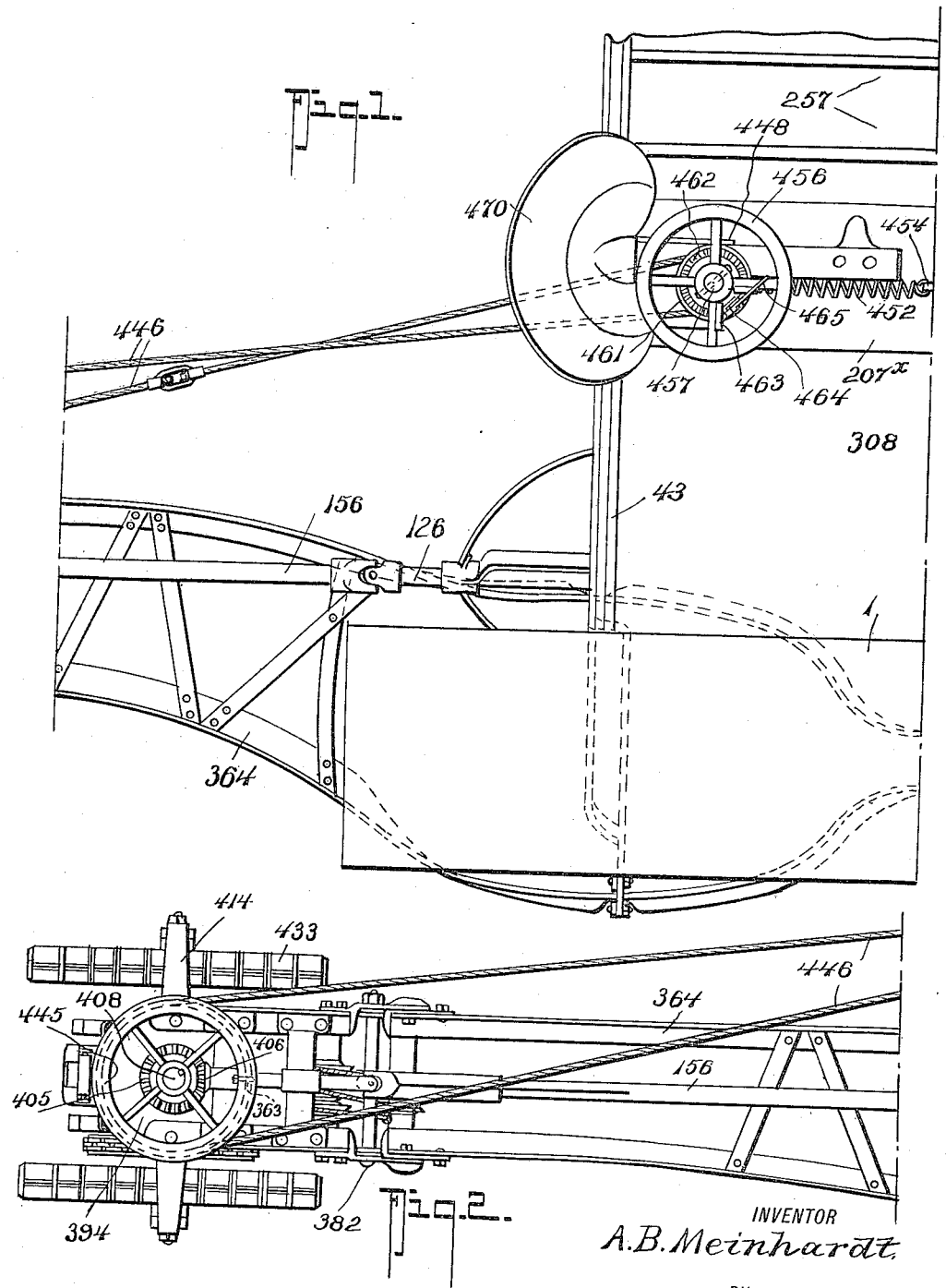

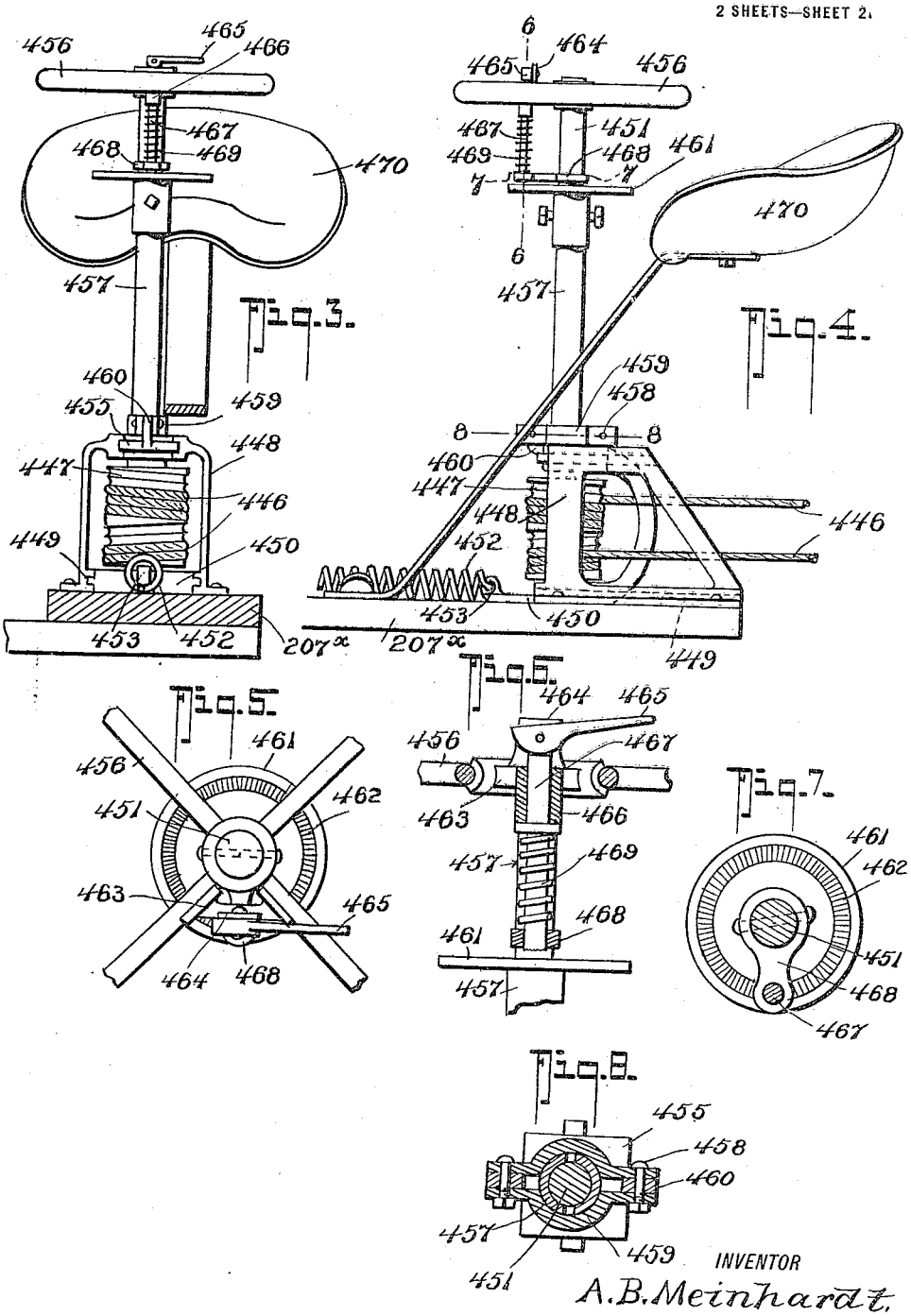

ADAM B. MEINHARDT, OF PAXICO, KANSAS.

STEERING MECHANISM FOR HARVESTERS.

1,224,005.
Specification of Letters Patent.
Patented Apr. 24, 1917.

Original application filed December 30, 1915, Serial No. 69,469. Divided and this application filed September 5, 1916. Serial No. 118,568.

*To all whom it may concern:*

Be it known that I, ADAM B. MEINHARDT, residing at Paxico, in the county of Wabaunsee and State of Kansas, have invented a new and useful Steering Mechanism for Harvesters, of which the following is a specification.

My invention relates to certain new and useful improvements in steering mechanism for harvesters of the type disclosed in my original application, Serial No. 69,469, filed December 30, 1915, of which application the present one is a divisional part.

In the harvester referred to, I provide a spokeless wheel which supports the power mechanism and one side of the main frame, the other side of which is supported by a caster wheel, while a third place of support lies in a trailer truck which is connected with the main frame by an articulated subframe, the truck performing the steering function for the machine, the control of which is effected by the operator located on the main frame, through the medium of drum and cable devices leading to the truck.

In this application I lay no claim to the steering mechanism broadly in combination with the special truck construction, driving machinery or other parts of the harvester which, in a generic sense, are combined with the steering mechanism, as such claims are included in my original application referred to, but the object of the present application is to cover the steering mechanism *per se* in its broad and specific aspects as adapted for use with this and other types of harvesters.

One of the objects of the present invention is to provide a conveniently operable controlling mechanism whereby the operator, on the main frame of the harvester, can turn the truck on its axis to any angle desired, to thereby enable the machine to be turned.

Means are also provided whereby the movement in the articulate joint of the subframe will be compensated for in the steering gear to keep the steering gear always in proper working order and under proper tension.

In my present invention, I provide a steering cable that is secured around a wheel or grooved sheave on the truck axis and is fastened at its end to a steering drum on the operator's platform which is located on the main frame of the harvester, means being provided for yieldably mounting the steering drum to compensate for the articulate motion of the sub-frame, there being means provided for "locking" the steering drum against turning when desired.

The invention also embodies those novel features of construction, combination and arrangement of parts, all of which will be first fully described and then be specifically pointed out in the appended claims, reference being had to the accompanying drawings, in which:

Figure 1 is a plan view of a portion of the harvester structure showing the spokeless wheel, a part of the main frame, a part of the operator's platform, the operator's seat, and a portion of the articulated sub-frame that connects the trailer truck with the main frame, operating parts of the harvester machinery, driving gears, etc., being omitted.

Fig. 2 is a plan view of the trailer truck and the truck end of the articulated frame, parts of the truck driving structure, etc., being omitted.

Fig. 3 is a detail front elevation of the operator's seat, the steering wheel and cable drum.

Fig. 4 is a side elevation of the parts exhibited in Fig. 3.

Fig. 5 is a detail top plan view of a portion of the steering wheel showing the holding or "locking" devices.

Fig. 6 is an enlarged detail vertical section on the line 6—6 on Fig. 4.

Fig. 7 is a detail horizontal section on the line 7—7 of Fig. 4, and

Fig. 8 is a detail horizontal section on the line 8—8 of Fig. 4.

In the drawings in which like numerals and letters of reference designate like parts in all the figures, 1 is the spokeless wheel which forms the main support and traction wheel of the harvester and in which one side of the main frame 43 is carried.

The grain platform conveyer is indicated by 257, while 308 represents the elevator and 207ˣ indicates the operator's platform.

126 indicates a driving shaft by which power is given to the transmission shaft 156 that drives the trailer truck wheels through suitable gearing 406—405, as clearly set forth in my original application hereinbefore referred to, but as such structure is not claimed herein, I, therefore, do not deem it necessary to fully illustrate the same in this application.

The pivot shaft 408 of the truck is fastened in a suitable way or forms a part of the yoke 414 in which the shafts of the wheels 433 are journaled. Keyed to the shaft 408 is a grooved wheel 445 around which the steering cable 446 is passed and to which the cable is fastened by a suitable eye bolt clamp 363 of any ordinary construction.

The articulated sub-frame 364 is connected at one end with a part of the main frame of the harvester and, at the other end, it is connected with the truck turn table 394, the articular joint being indicated at 382.

448 is a frame on the rear of the operator's platform which has a lower slide way 449, for a slide 450 that forms the lower or step bearing for the steering post 451.

The drum 447 is secured to turn with the post and the slide is yieldably held by a spring 452 fastened to it at 453 and secured at 454 to the platform (see Fig. 1), the spring taking up slack in the steering cables. The post 451 is also held in a trunnion bearing 455.

A hand wheel 456 is provided for setting purposes and in order to hold the post 451 from turning, when desired, a sleeve 457 is placed on the shaft and fastened at 458 to lugs 460 from the trunnion bearing 455 by a clamp 459 (see Figs. 3 to 8).

At the upper end, the sleeve 457 carries a plate 461 which has a roughened surface portion 462.

A bracket 463 is secured to the steering wheel 456 (see Fig. 5) and has a lug 464 to which the cam lever 465 is fulcrumed. The bracket also has a bearing 466 in the pin 467. The lower end passes through a guide bracket 468 pinned to the post 451 (see Fig. 7) and is adapted to be moved to engage the surface 462 by the action of the lever 465 against the resistance of a spring 469 (see Fig. 5). The operator's seat 470 is supported on a standard 471.

In using my steering mechanism, the operator turns the steering wheel at the drum and thus turns the trailer truck through the drum and cable connections. When the truck has been set to the desired angle, the steering post is locked by the mechanism hereinbefore described to hold the truck in its desired position, it being understood that in the use of my invention in connection with the harvester that constitutes the subject matter of my original application, suitable propulsion devices are provided for driving the trailer truck wheels to swing the machine around on the spokeless wheel as a pivot.

From the foregoing description taken in connection with the drawings, it is thought the construction of the invention will be clear to those skilled in the art.

What I claim is:

1. In a harvester, a body frame, a trailer truck, an auxiliary or sub-frame between said truck and said body frame, said trailer truck including traction wheels, a supporting yoke therefor pivoted to turn on a vertical axis, a steering mechanism controlled from the body frame and connected with said yoke for turning the same, said steering mechanism comprising a steering post on the body frame having a steering wheel, and drum and cable connections between said post and said truck yoke.

2. In a harvester, a body frame, a trailer truck, an auxiliary or sub-frame between said truck and said body frame, said trailer truck including traction wheels, a supporting yoke therefor pivoted to turn on a vertical axis, a steering mechanism controlled from the body frame and connected with said yoke for turning the same, said steering mechanism comprising a steering post on the body frame having a steering wheel, and drum and cable connections between said post and said truck yoke, and means for yieldably supporting said post.

3. In a harvester, a body frame, a trailer truck, an auxiliary or sub-frame between said truck and said body frame, said trailer truck including traction wheels, a supporting yoke therefor pivoted to turn on a vertical axis, a steering mechanism controlled from the body frame and connected with said yoke for turning the same, said steering mechanism comprising a steering post on the body frame having a steering wheel, and drum and cable connections between said post and said truck yoke, and a locking device for holding said steering post against turning.

4. In a harvester, a body frame, a trailer truck, an auxiliary or sub-frame between said truck and said body frame, said trailer truck including traction wheels, a supporting yoke therefor pivoted to turn on a vertical axis, a steering mechanism controlled from the body frame and connected with said yoke for turning the same, said steering mechanism comprising a steering post on the body frame having a steering wheel, and drum and cable connections between said post and said truck yoke, and means for yieldably supporting said post, and a locking device for holding said steering post against turning.

5. In a harvester, a body frame, a trailer truck, an auxiliary or sub-frame between said truck and said body frame, said trailer truck including traction wheels, a supporting yoke therefor pivoted to turn on a vertical axis, a steering mechanism controlled from the body frame and connected with said yoke for turning the same, said steering mechanism comprising a steering post on the body frame having a steering wheel, and drum and cable connection between said post and said truck yoke, and a locking device for holding said steering post against turning, said locking device comprising a fixed plate, a plunger mounted on said steering post and wheel, a cam device to force said plunger against said plate and means for retracting said plunger when released.

6. In a harvester, a body frame, a trailer truck, an auxiliary or sub-frame between said truck and said body frame, said trailer truck including traction wheels, a supporting yoke therefor pivoted to turn on a vertical axis, a steering mechanism controlled from the body frame and connected with said yoke for turning the same, said steering mechanism comprising a steering post on the body frame having a steering wheel, and drum and cable connections between said post and said truck yoke, and means for yieldably supporting said post, and a locking device for holding said steering post against turning, said locking device comprising a fixed plate, a plunger mounted on said steering post and wheel, a cam device to force said plunger against said plate and means for retracting said plunger when released.

7. In a harvester, a main or body frame, wheel supports for the same including a trailer truck, an articulated frame joining the truck with the main frame, said truck including a vertical pivot shaft and a yoke frame carried thereby and truck wheels journaled in said yoke frame, a turning wheel on said pivot shaft, a steering shaft having a drum mounted on said main frame, a cable connection between said drum and said turning wheel, and a take-up device coöperative with the aforesaid structure for automatically maintaining said cable connection taut during the articulate movement of said articulated frame.

ADAM B. MEINHARDT.

Copies of this patent may be obtained for five cents each, by addressing the "Commissioner of Patents, Washington, D. C."